United States Patent [19]

Yoshioka

[11] Patent Number: 5,063,885

[45] Date of Patent: Nov. 12, 1991

[54] INTAKE SYSTEM FOR V-TYPE ENGINE

[75] Inventor: Shinji Yoshioka, Iwata, Japan

[73] Assignee: Yamaha Hatsudoki Kabushiki Kaisha, Iwata, Japan

[21] Appl. No.: 567,410

[22] Filed: Aug. 14, 1990

[30] Foreign Application Priority Data

Aug. 18, 1989 [JP] Japan .................................. 1-211413

[51] Int. Cl.$^5$ ............................................ F02M 35/10
[52] U.S. Cl. ............................................ 123/52 MV
[58] Field of Search ......... 123/52 MV, 52 MB, 52 M, 123/55 VS, 55 VE, 198 C

[56] References Cited

U.S. PATENT DOCUMENTS

| 2,845,911 | 8/1958 | Gill | 123/52 MV |
|---|---|---|---|
| 2,845,912 | 8/1958 | Bird | 123/52 MV |
| 2,974,654 | 3/1961 | Bouvy | 123/52 MV |
| 4,565,163 | 1/1986 | Ishimi et al. | 123/55 VS |
| 4,662,320 | 5/1987 | Moriya | 123/198 C |
| 4,741,295 | 5/1988 | Hosoya et al. | 123/52 MV |
| 4,889,083 | 12/1989 | Honma et al. | 123/52 MV |
| 4,970,994 | 11/1990 | Sawada et al. | 123/52 MV |

FOREIGN PATENT DOCUMENTS

| 1167132 | 11/1958 | France | 123/52 MV |
|---|---|---|---|
| 586514 | 12/1958 | Italy | 123/52 MV |
| 63-68705 | 3/1988 | Japan | 123/65 PE |
| 63-143318 | 6/1988 | Japan | 123/52 MV |

Primary Examiner—David A. Okonsky
Attorney, Agent, or Firm—Ernest A. Beutler

[57] ABSTRACT

An improved high efficiency compact induction system for a V-type internal combustion engine that includes a plenum chamber that extends through the valley of the engine and a plurality of intake pipes that extend from the intake ports of the cylinders of one of the banks, across the valley and which enters the plenum chamber adjacent the intake ports of the other cylinder. A plurality of second intake pipes extend from the intake ports of the other cylinder, across the valley and enter the plenum chamber on the side adjacent the intake ports of the one cylinder bank. The points of entry of the intake pipes with the plenum chamber lie under the other intake pipes so as to provide adequate length for the intake pipes and maintain a relatively short overall length for the induction system.

32 Claims, 4 Drawing Sheets

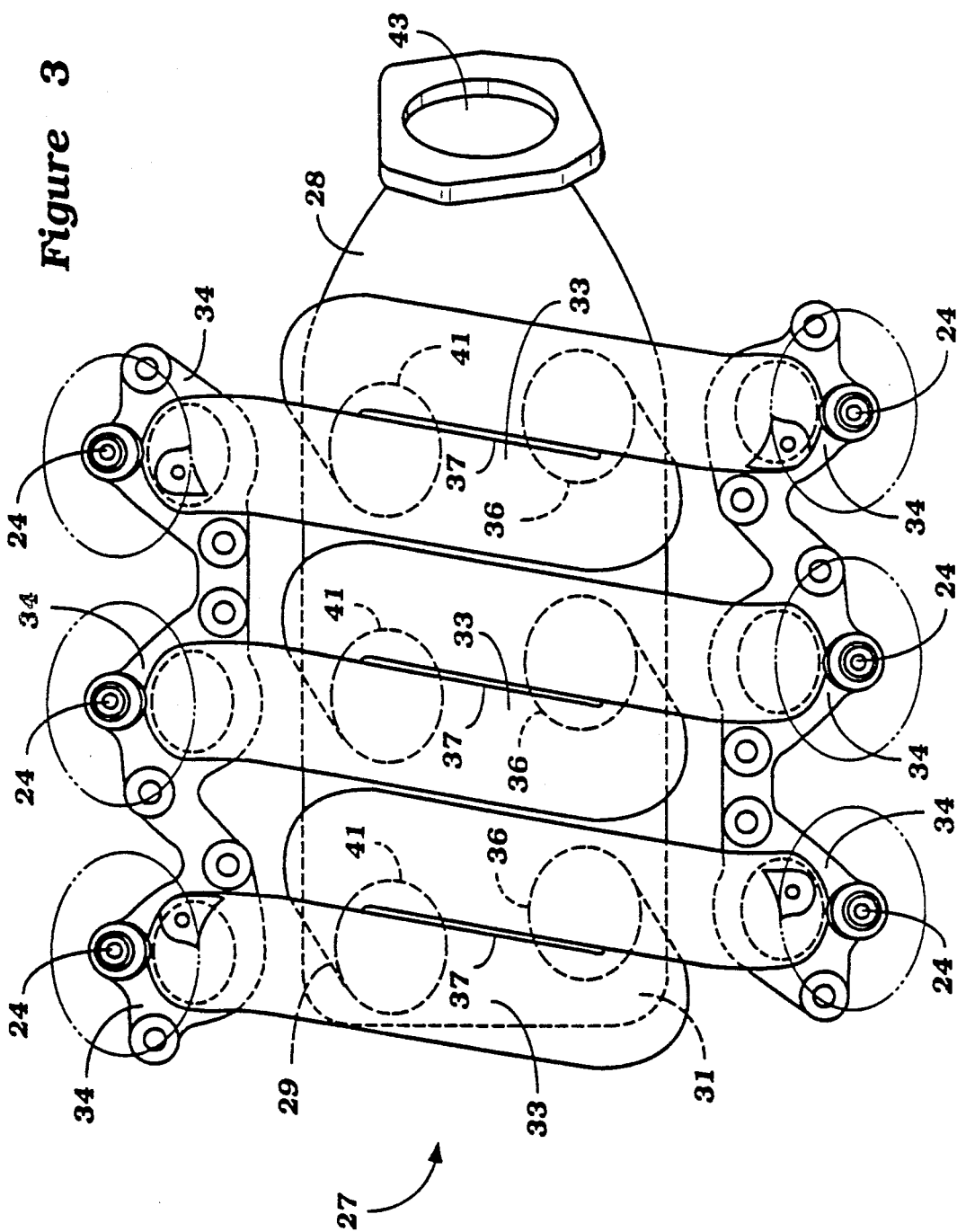

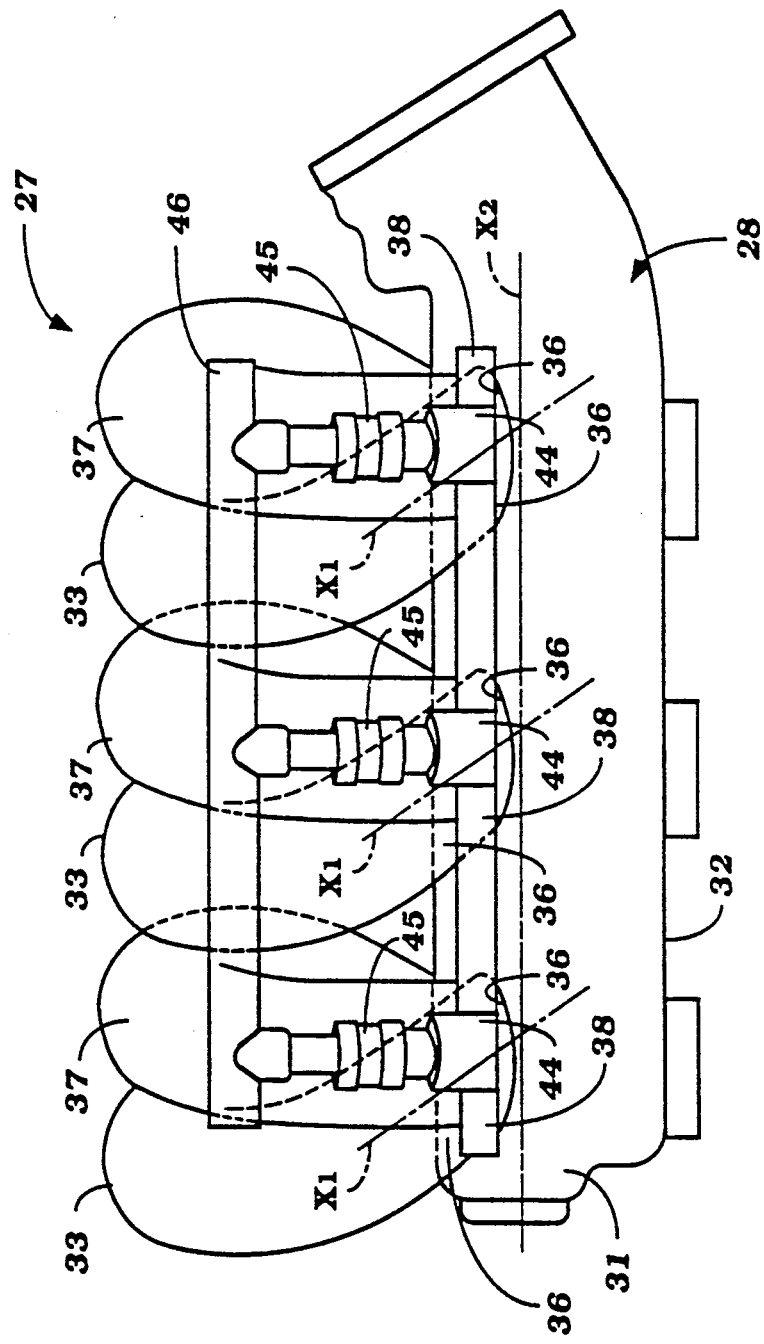

5,063,885

INTAKE SYSTEM FOR V-TYPE ENGINE

BACKGROUND OF THE INVENTION

This invention relates to an intake system for a V-type engine and more particularly to an improved compact high efficiency intake system for a V-type engine.

It is known that the induction efficiency for an internal combustion engine can be improved by employing a plenum chamber for the engine which communicates with the intake port through an intake pipe the length of which is tuned to optimize running under certain running conditions. Generally, the length of the connecting pipe is tuned so as to improve low and mid range performance and as such it should have a relatively long length. However, with multiple cylinder engines and modern automotive engine compartments, it is very difficult to maintain such long intake pipes without increasing the hood clearance or encroaching upon other components contained within the engine compartment and other portions of the engine.

In conjunction with V-type engines, it has been proposed to position the plenum chamber in the valley of the V so as to improve the compactness of the engine. However, when multiple cylinders are employed, the intake pipes generally are arrayed in parallel or transverse relationship extending across the valley of the engine from one intake port of one cylinder to enter the plenum chamber adjacent a cylinder of the opposite bank. However, such side by side array in the positioning of the intake pipes substantially increases the length of the induction system.

It is also desirable to mount certain auxiliaries of the engine or components of the engine in the valley between the cylinder banks so as to provide a compact assembly. However, within induction systems of the type previously described this has not been possible due to the length of the plenum chamber and the interconnecting pipes. In addition, the arrangements as aforedescribed either do not permit optimum length for the intake pipes or the pipes become so entangled with each other that the manifolding is expensive to manufacture and also difficult to service.

It is, therefore, a principal object of this invention to provide an improved intake system for a V-type engine.

It is a further object of this invention to provide a compact, high efficiency intake system for a V-type engine.

It is a further object of this invention to provide an intake system for a V-type engine which intake system is of the type as aforedescribed and which nevertheless permits the use of long intake pipes for tuning purposes without increasing the length of the induction system or without having to have the intake pipes being intertwined with each other.

SUMMARY OF THE INVENTION

This invention is adapted to be embodied in an induction system for an internal combustion engine having a pair of angularly disposed cylinders defining a valley therebetween. A plenum chamber extends longitudinally of the engine and through the valley. Each of the cylinders has an intake port extending adjacent the valley. A first intake pipe extends from one of the intake ports into the valley and enters the plenum chamber on the side thereof adjacent the other of the cylinders. A second intake pipe extends from the intake port of the other cylinder across the valley and enters the plenum chamber adjacent the one cylinder and under the first intake pipe.

BRIEF DESCRIPTION OF THE DRAWINGS

FIG. 3 is an enlarged top plan view of the intake system.

FIG. 4 is a side elevational view of the intake system.

DETAILED DESCRIPTION OF THE PREFERRED EMBODIMENT OF THE INVENTION

Figure 1:
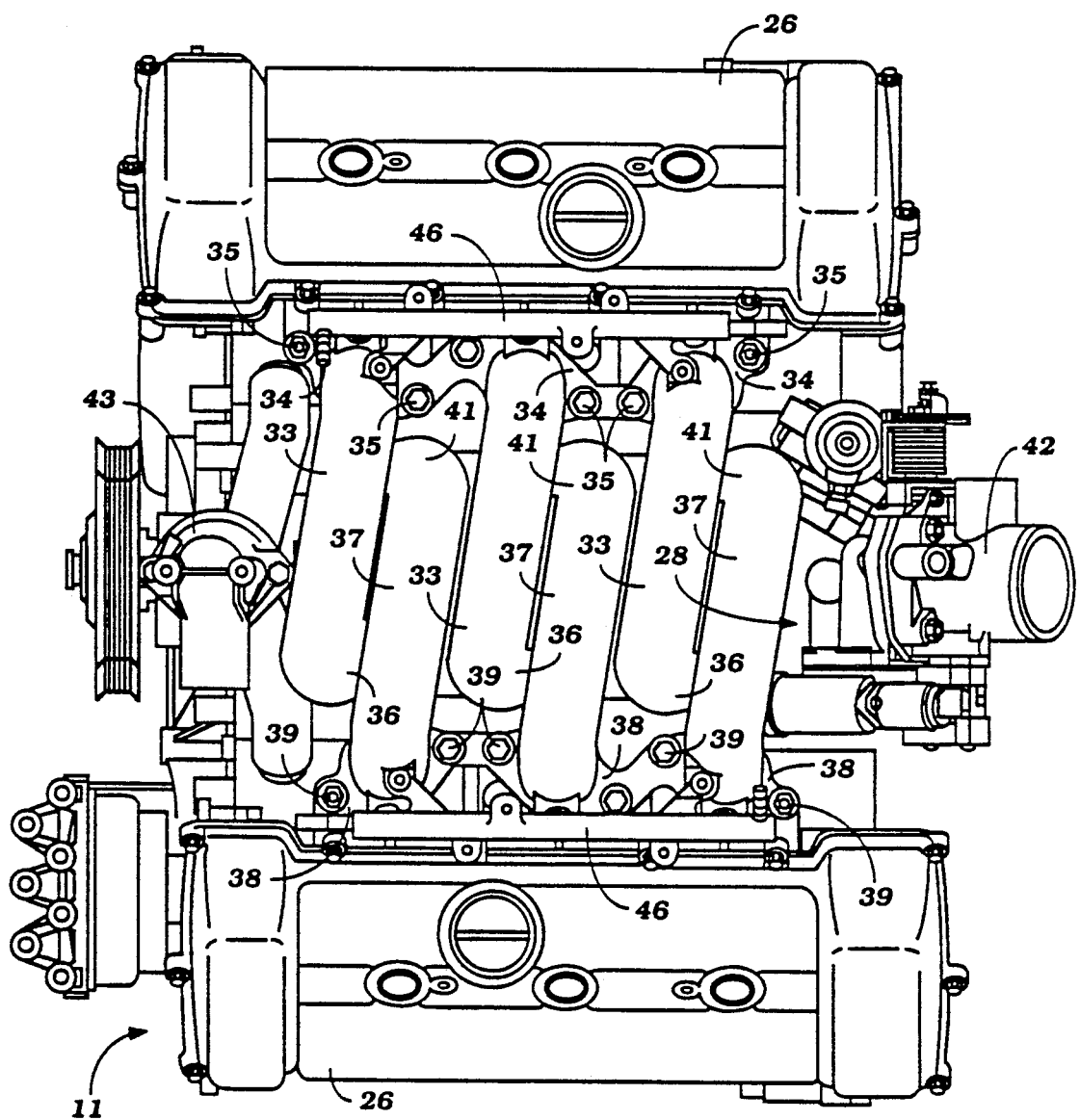
FIG. 1 is a top plan view of an internal combustion engine constructed in accordance with an embodiment of the invention.
Figure 2:
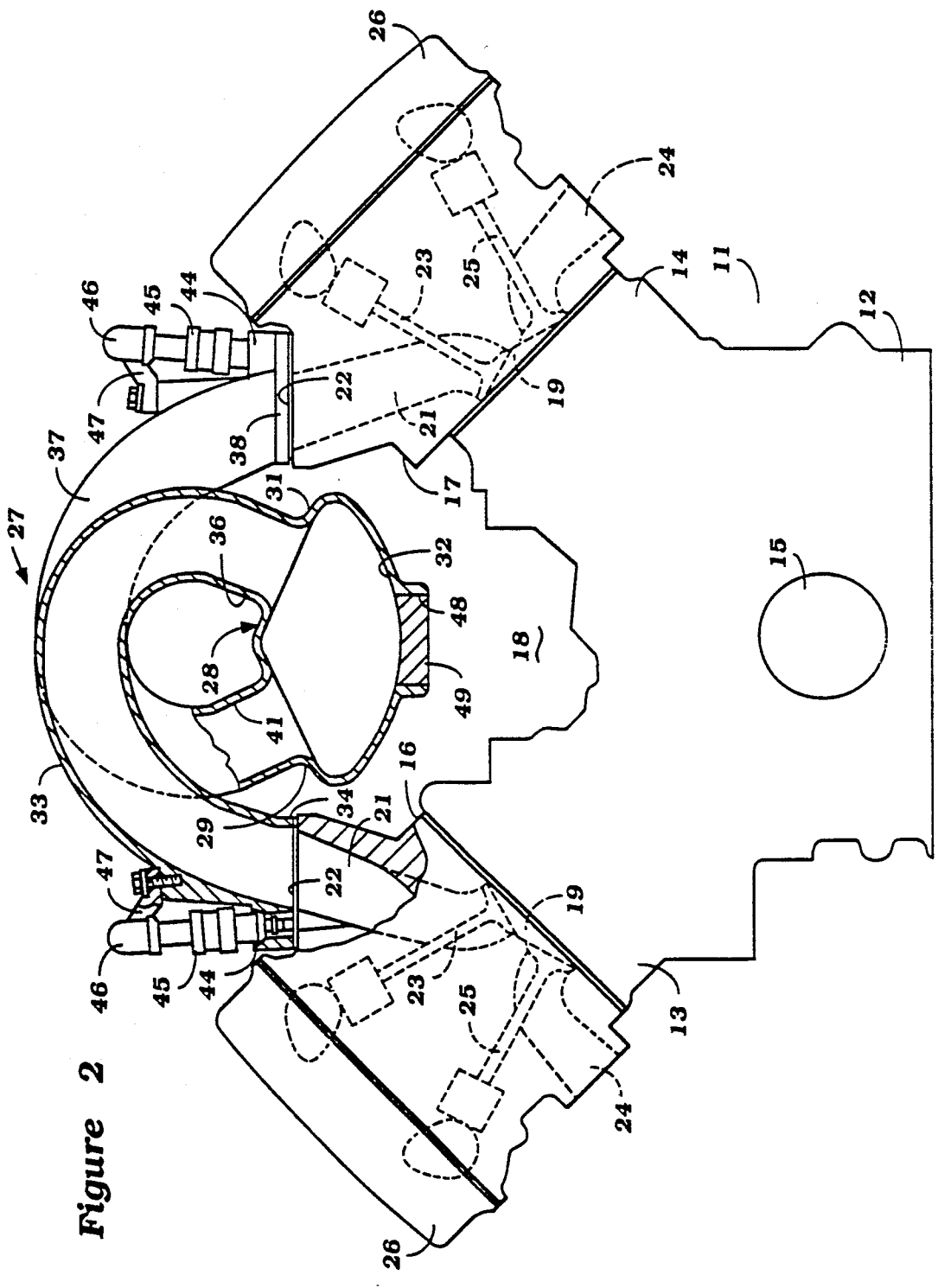
FIG. 2 is a partial front elevational view thereof, with certain components removed so as to more clearly show the intake system and with portions of the intake system broken away and shown in section.

Referring first to FIGS. 1 and 2, an internal combustion engine constructed in accordance with an embodiment of the invention is identified generally by the reference numeral 11. In the illustrated embodiment, the engine 11 is of the V6 type. It is to be understood, however, that the invention can be practiced with engines having other numbers of cylinders but has particular utility in multi-cylinder V-type engines.

The engine 11 includes a cylinder block 12 that has a pair of angularly disposed cylinder banks 13 and 14 each of which contains a plurality of aligned cylinder bores. As is typical with V-type engine practice, the cylinder bores of the banks 13 and 14 are staggered relative to each other so that connecting rods that connect pistons of the respective cylinder banks to a crankshaft, indicated at 15 and journaled in the cylinder block 12 in a known manner, may be positioned in side by side relationship on a single throw of the crankshaft.

Cylinder heads 16 and 17 are affixed in a known manner to the respective cylinder banks 13 and 14 and define therebetween a valley 18. Each cylinder head 16 and 17 has a plurality of combustion chambers or recesses 19 that cooperate with the cylinder bores and pistons in a well known manner. Intake ports 21 extend from generally horizontally extending surfaces 22 of the cylinder heads 16 and 17 respectively and terminate at the combustion chamber recesses 19. Intake valves 23 control the communication of the intake ports 21 with the combustion chamber recesses 19 in a well known manner. It is to be understood that the invention may be employed with engines having more than one intake valve 23 for each cylinder of the engine. Also, the invention can be utilized in conjunction with such multiple valve engines either having single siamese intake ports 21 or separate intake ports.

Exhaust ports 24 extend through the sides of the cylinder heads 16 and 17 opposite to the intake ports 21 from the combustion chamber recesses 19 and discharge to the atmosphere in a well known manner. Exhaust valves 25 control the communication of the combustion chamber recesses 19 with the exhaust ports 24.

The intake valves 23 and exhaust valves 25 are operated in any suitable manner, as by respective overhead camshafts which are contained within a chamber defined by the cylinder heads 16 and 17 and cam covers 26 that are affixed thereto in a known manner. Since the invention deals primarily with the induction system, which is indicated generally by the reference numeral 27, it is believed that a further description of those portions of the engine which are conventional is not necessary to understand the construction and operation of the invention.

The induction system 27 includes a plenum chamber, indicated generally by the reference numeral 28 which extends through the valley 18 and which lies, in substantial part, below the cylinder head surfaces 22 as clearly shown in FIG. 2. The plenum chamber 28 is designed so as to have adequate capacity so as to dampen pulsations between the respective cylinders during their intake cycle and so as to ensure an adequate volume for appropriate tuning. It should be noted that the plenum chamber 28 has, in transverse cross-sections, a configuration generally elliptical which is defined by a pair of angularly disposed upper surfaces 29 and 31 and a curved lower surface 32. This configuration has been found to provide a good air flow through the plenum chamber 28 and appropriate tuning.

A first series of intake pipes 33 extend from flanges 34 that are affixed by bolts 35 to the cylinder head 16. The intake pipes 33 extend from the respective intake ports 21 generally in an upward direction across the valley 18 and then have a re-entrant portion that enters the plenum chamber 28 through an opening in the wall portion 31 adjacent the cylinder head 17. This portion that enters the plenum chamber 28 is identified by the reference numeral 36.

A second series of intake pipes 37 have a flange portion 38 that is affixed, as by bolts 39 to the cylinder head 17. The intake pipes 37 each extend from one of the intake ports 21 of the cylinder head 17 across the valley 18 of the V in generally parallel relationship to the first series of intake pipes 33 and enter the plenum chamber 28 through curved end portions 41 that extend through the wall 29 of the plenum chamber 28 adjacent the cylinder head 16.

As may be best seen in FIGS. 3 and 4, the intake ports 21 of the respective cylinder heads are staggered relative to each other and hence the portion of the intake pipes 33 and 37 that extend from the intake ports of the respective cylinder heads 16 and 17 can extend generally parallel to each other. However, their respective end portions 36 and 41 are curved both longitudinally and in a fore and aft direction so that the points of entry of each of the intake pipes 33 to the plenum chamber 28 lie beneath the intake pipes 37. In a like manner, the point of entry of the intake pipes 37 into the plenum chamber 28 lies below the intake pipes 33. The angle of intersection with the plenum chamber 28 through the centerline $X_1$ (FIG. 4) is also disposed at an acute angle to the plane $X_2$ of the center of the plenum chamber 28. As a result, this permits an increase in the effective length of the intake pipes 33 and 37 without increasing the length of the plenum chamber 28. As a result of this, it is possible to attach a throttle body, indicated generally by the reference numeral 42 to a flange 43 of the plenum chamber 28 at least in part extending into the valley 18 at one end of the engine. A throttle valve (not shown) is provided in the throttle body 42 for controlling the speed of the engine in a known manner.

In a like manner, another accessory such as a water pump and thermostat housing 43 may be positioned in the valley 18 at the opposite end of the engine due to the compact configuration of the induction system 27. This would not be possible with prior art type construction.

Each of the flanges 34 and 38 of the respective intake pipes 33 and 37 is formed with embossments 44 that receive a plurality of fuel injection nozzles 45 for spraying a fuel charge into the respective intake ports 21 of the cylinder heads 16 and 17. Fuel is supplied to the fuel injection nozzles 45 through respective fuel rails 46 that are affixed to the induction system 27 by means of mounting brackets 47.

The curved lower surface 32 of the plenum chamber 28 is provided with a plurality of tool receiving openings 48 through which tools may pass so as to machine the openings where the intake pipe portions 36 and 41 enter the plenum chamber 28. Once machined and cleaned, the openings 48 are closed by plugs 49.

It should be readily apparent from the foregoing description that the described induction system is extremely compact and nevertheless provides a very effective plenum chamber having a large volume and long intake pipes that extend from the intake ports to the plenum chamber. This is accomplished without increasing the length of the plenum chamber and permits a number of accessories or auxiliaries for the engine to be positioned within the valley of the V in addition to the induction system. Of course, the foregoing description is that of a preferred embodiment of the invention and various changes and modifications may be made without departing from the spirit and scope of the invention as defined by the appended claims.

I claim:

1. An induction system for an internal combustion engine having a pair of angularly disposed cylinders defining a valley therebetween, a plenum chamber extending longitudinally of said engine and through said valley, each of said cylinders having an intake port extending adjacent said valley, a first intake pipe extending from one of said intake ports of one of said cylinders into said valley and entering said plenum chamber on the side thereof adjacent the other of said cylinders, and a second intake pipe extending from the intake port of the other cylinder across said valley and entering said plenum chamber adjacent said one cylinder and under said first intake pipe, the entry of said first intake pipe into said plenum chamber lying under said second intake pipe.

2. An induction system as set forth in claim 1 wherein the first and second intake pipes extend parallel to each other from their respective intake port across the valley and before the point of entry into the plenum chamber.

3. An induction system for an internal combustion engine having a pair of angularly disposed cylinder banks, each having a plurality of cylinders, and defining a valley therebetween, a plenum chamber extending longitudinally of said engine and through said valley, each of said cylinders having an intake port extending adjacent said valley, all of the cylinders of one bank being served by a plurality of first intake pipes extending from the intake ports of each of the cylinders of the one cylinder bank to the plenum chamber and entering the sides thereof adjacent the other cylinder bank and all of the cylinders of the cylinders of the other bank being served by a plurality of second intake pipes each extending from the intake ports of the other cylinder bank to said plenum chamber and entering the side thereof adjacent said one cylinder bank and under a respective one of said first intake pipes.

4. An induction system as set forth in claim 3 wherein there is positioned an engine accessory in the valley at one end of the engine and adjacent one end of the plenum chamber.

5. An induction system as set forth in claim 4 wherein the accessory comprises a water pump.

6. An induction system as set forth in claim 4 wherein the accessory comprises a throttle body containing a throttle valve for controlling the flow of air into the plenum chamber from the atmosphere.

7. An induction system as set forth in claim 4 wherein there are provided accessories for the engine at each end of the engine within the valley and adjacent the adjacent end of the plenum chamber.

8. An induction system as set forth in claim 7 wherein one of the accessories comprises a water pump for the engine.

9. An induction system as set forth in claim 7 wherein one of the accessories comprises a throttle body containing a throttle valve for controlling the flow of atmospheric air into the plenum chamber.

10. An induction system as set forth in claim 9 wherein the other accessory comprises a water pump for the cooling system of the engine.

11. An induction system for an internal combustion engine having a pair of angularly disposed cylinders defining a valley therebetween, a plenum chamber extending longitudinally of said engine and through said valley, each of said cylinders having an intake port extending adjacent said valley, a first intake pipe extending from one of said intake ports of one of said cylinders into said valley and entering said plenum chamber on the side thereof adjacent the other of said cylinders, and a second intake pipe extending from the intake port of the other cylinder across said valley and entering said plenum chamber adjacent said one cylinder and under said first intake pipe, said first and second intake pipes extending parallel to each other from their respective intake port across said valley and before the point of entry into said plenum chamber.

12. An induction system as set forth in claim 11 wherein the cylinders define respective cylinder banks and wherein there are a plurality of cylinders formed in each of the cylinder banks, there being a plurality of first intake pipes extending from the intake ports of each of the cylinders of the one cylinder bank to the plenum chamber and a plurality of second intake pipes extending from the intake ports of the other cylinder bank to the plenum chamber as described.

13. An induction system as set forth in claim 12 wherein there is positioned an engine accessory in the valley at one end of the engine and adjacent one end of the plenum chamber.

14. An induction system as set forth in claim 13 wherein the accessory comprises a water pump.

15. An induction system as set forth in claim 13 wherein the accessory comprises a throttle body containing a throttle valve for controlling the flow of air into the plenum chamber from the atmosphere.

16. An induction system as set forth in claim 13 wherein there are provided accessories for the engine at each end of the engine within the valley and adjacent the adjacent end of the plenum chamber.

17. An induction system as set forth in claim 16 wherein one of the accessories comprises a water pump for the engine.

18. An induction system as set forth in claim 16 wherein one of the accessories comprises a throttle body containing a throttle valve for controlling the flow of atmospheric air into the plenum chamber.

19. An induction system as set forth in claim 18 wherein the other accessory comprises a water pump for the cooling system of the engine.

20. An induction system as set forth in claim 19 wherein the plenum chamber has a generally elliptical shape in transverse cross-sections formed by a pair of angular related upper surfaces through which the respective intake pipes enter and a curved lower surface.

21. An induction system for an internal combustion engine having a pair of angularly disposed cylinders defining a valley therebetween, a plenum chamber extending longitudinally of said engine and through said valley, each of said cylinders having an intake port extending adjacent said valley, a first intake pipe extending from one of said intake ports of one of said cylinders into said valley and entering said plenum chamber on the side thereof adjacent the other of said cylinders, and a second intake pipe extending from the intake port of the other cylinder across said valley and entering said plenum chamber adjacent said one cylinder and under said first intake pipe, said plenum chamber having a generally elliptical shape in transverse cross-sections formed by a pair of angular related upper surfaces through which the respective intake pipes enter and a curved lower surface.

22. An induction system as set forth in claim 3 wherein the first and second pipes lie in side by side relationship to each other along the length of the engine so that substantially no gap extends between adjacent pipes.

23. An induction system as set forth in claim 22 wherein the entry of each of the first intake pipes into the plenum chambers lies under a respective one of the second intake pipes.

24. An induction system as set forth in claim 22 wherein the first and second intake pipes extend parallel to each other from their respective intake port across the valley and before the point of entry into the plenum chamber.

25. An induction system as set forth in claim 23 wherein the first and second intake pipes extend parallel to each other from their respective intake port across the valley and before the point of entry into the plenum chamber.

26. An induction system as set forth in claim 22 wherein there is positioned an engine accessory in the valley at one end of the engine and adjacent one end of the plenum chamber.

27. An induction system as set forth in claim 26 wherein the accessory comprises a water pump.

28. An induction system as set forth in claim 26 wherein the accessory comprises a throttle body containing a throttle valve for controlling the flow of air into the plenum chamber from the atmosphere.

29. An induction system as set forth in claim 26 wherein there are provided accessories of the engine at each end of the engine within the valley and adjacent the adjacent end of the plenum chamber.

30. An induction system as set forth in claim 29 wherein one of the accessories comprises a water pump for the engine.

31. An induction system as set forth in claim 29 wherein one of the accessories comprises a throttle body containing a throttle valve for controlling the flow of atmospheric air into the plenum chamber.

32. An induction system as set forth in claim 31 wherein the other accessory comprises a water pump for the cooling system of the engine.

* * * * *